(12) United States Patent
De Souza et al.

(10) Patent No.: US 8,407,383 B2
(45) Date of Patent: Mar. 26, 2013

(54) SYSTEM FOR CONTROLLING INPUT AND OUTPUT RESOURCES FOR ADDRESSABLE DEVICES

(76) Inventors: Mauricio De Souza, Florianopolis (BR); Sergio Vargas De Souza, Florianopolis (BR)

( * ) Notice: Subject to any disclaimer, the term of this patent is extended or adjusted under 35 U.S.C. 154(b) by 0 days.

(21) Appl. No.: 13/073,096

(22) Filed: Mar. 28, 2011

(65) Prior Publication Data

US 2012/0254476 A1   Oct. 4, 2012

(51) Int. Cl.
*G06F 3/00* (2006.01)
*G06F 13/00* (2006.01)

(52) U.S. Cl. ............ 710/72; 710/4; 710/5; 710/28; 710/29; 710/62; 710/65; 710/312; 709/223; 709/224; 709/225; 709/226; 709/227; 709/206; 709/208

(58) Field of Classification Search ............ 710/4, 5, 710/28, 29, 62, 65, 72, 312; 709/223–227, 709/206, 208
See application file for complete search history.

(56) References Cited

U.S. PATENT DOCUMENTS

| | | | | |
|---|---|---|---|---|
| 8,316,137 B2* | 11/2012 | Tremaine et al. | ............ | 709/227 |
| 2007/0285227 A1* | 12/2007 | Timothy et al. | .......... | 340/539.13 |
| 2010/0031371 A1 | 2/2010 | Adams et al. | .................. | 726/27 |
| 2010/0185787 A1* | 7/2010 | Krantz et al. | .................. | 710/19 |
| 2010/0257549 A1* | 10/2010 | Nam | .............................. | 725/25 |

* cited by examiner

*Primary Examiner* — Tammara Peyton
(74) *Attorney, Agent, or Firm* — Sanchelima & Associates, P.A.

(57) ABSTRACT

A system and method for a establishing a data connection between peripherals through a global computer network. The global computer network having at least two computerized addressable stations connected to a network, and each of the stations including at least one input and at least one output. A computerized server with a storage assembly with software that includes sufficient data and instructions to communicate with the stations to keep a database with information of the station's peripheral resources updated. Each station includes a service software that initiates upon booting the station and keeps track of the peripheral resources and assigned address (ex. IP address) for periodically updating the server's database with changes. Users with friendly interfaces have access to the subscribed stations and their resources as requested and target stations.

19 Claims, 21 Drawing Sheets

SYSTEM FOR CONTROLLING INPUT AND OUTPUT RESOURCES FOR ADDRESSABLE DEVICES

BACKGROUND OF THE INVENTION

1. Field of the Invention

The present invention relates to a system for controlling input and output peripheral resources for addressable devices, and more particularly, to selectively and remotely coordinate the interaction of the peripheral resources through the devices.

2. Description of the Related Art

Several designs for systems that control the input and output resources for addressable devices have been designed in the past. None of them, however, include a means of creating a network connection allowing for peripherals of addressable devices to be remotely controlled. One of the advantages of the present invention is to provide a user-friendly means of controlling input and output resources for subscribed addressable devices.

Applicant believes that the closest reference corresponds to U.S. patent application publication No. US2010/0031371A1 issued to Neil Adams on Feb. 4, 2010. Adam's publication includes a network to allow a mobile device to handle the data connection to a multitude of peripherals. However, it differs from the present invention because it does not teach the ability to transfer control and data signals between addressable devices with peripherals by selectively choosing peripherals in a device and allowing it to control peripherals in another. The present invention establishes a data control signal connection between devices with peripherals through a network that allows the user to select which inputs and outputs he/she would like to relay data and control signals to and from.

Other documents or references describing the closest subject matter provide for a number of more or less complicated features that fail to solve the problem in an efficient and economical way. None of these patents suggest the novel features of the present invention.

SUMMARY OF THE INVENTION

It is one the objects of this invention to provide a system for remotely controlling the input and output peripheral resources of at least one subscribed addressable device.

BRIEF DESCRIPTION OF THE DRAWINGS

With the above and other related objects in view, the invention consists in the details of construction and combination of parts as will be more fully understood from the following description, when read in conjunction with the accompanying drawings in which.

Figure 1:
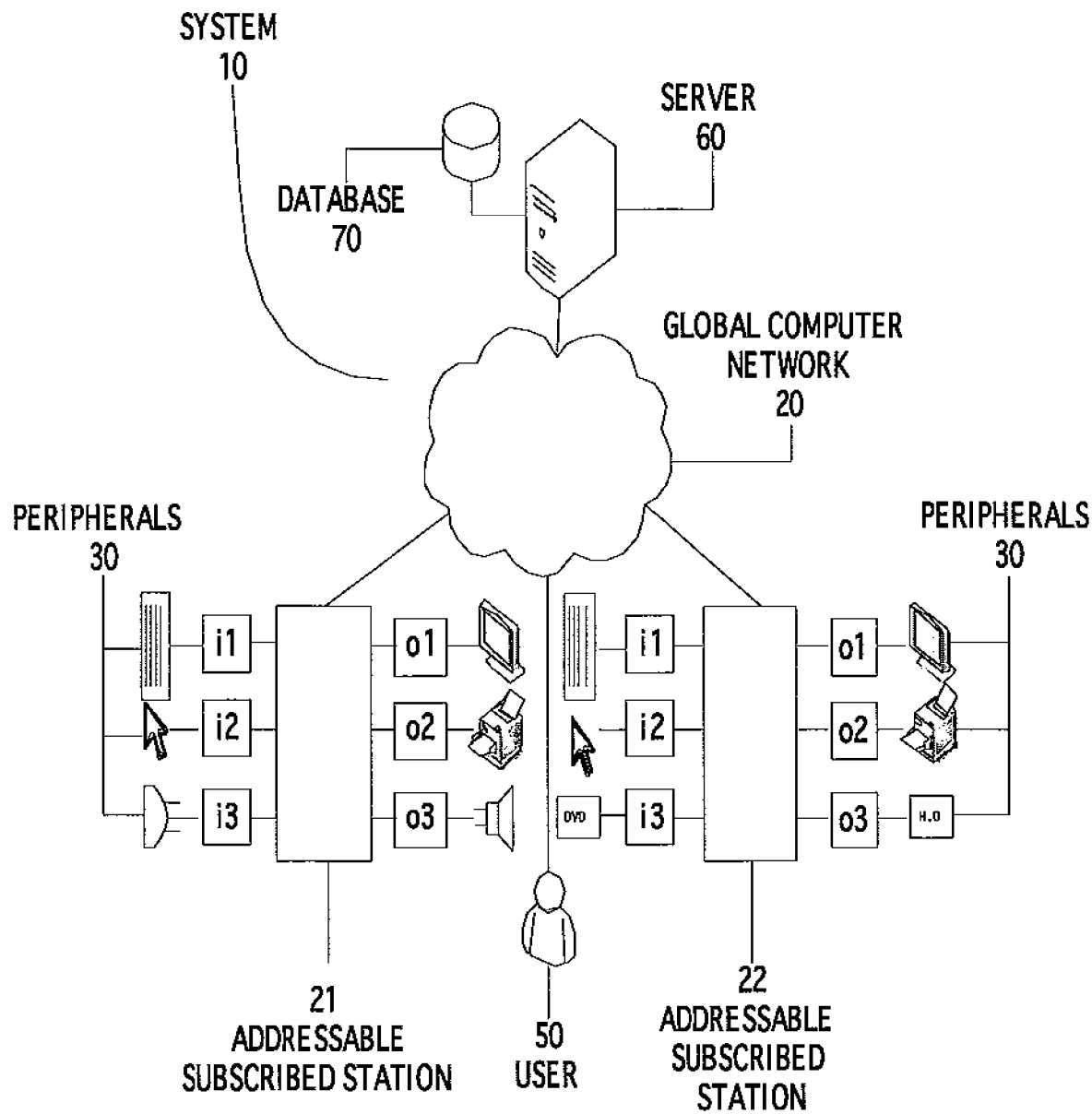
FIG. 1 represents one of the embodiments of the system subject of the present invention where a global computer network 20 is represented with two representative addressable subscribed stations 21; 22 and a server 60 connected thereto. A user 50 with privileges to access the server's controlling software is also represented.
Figure 2:
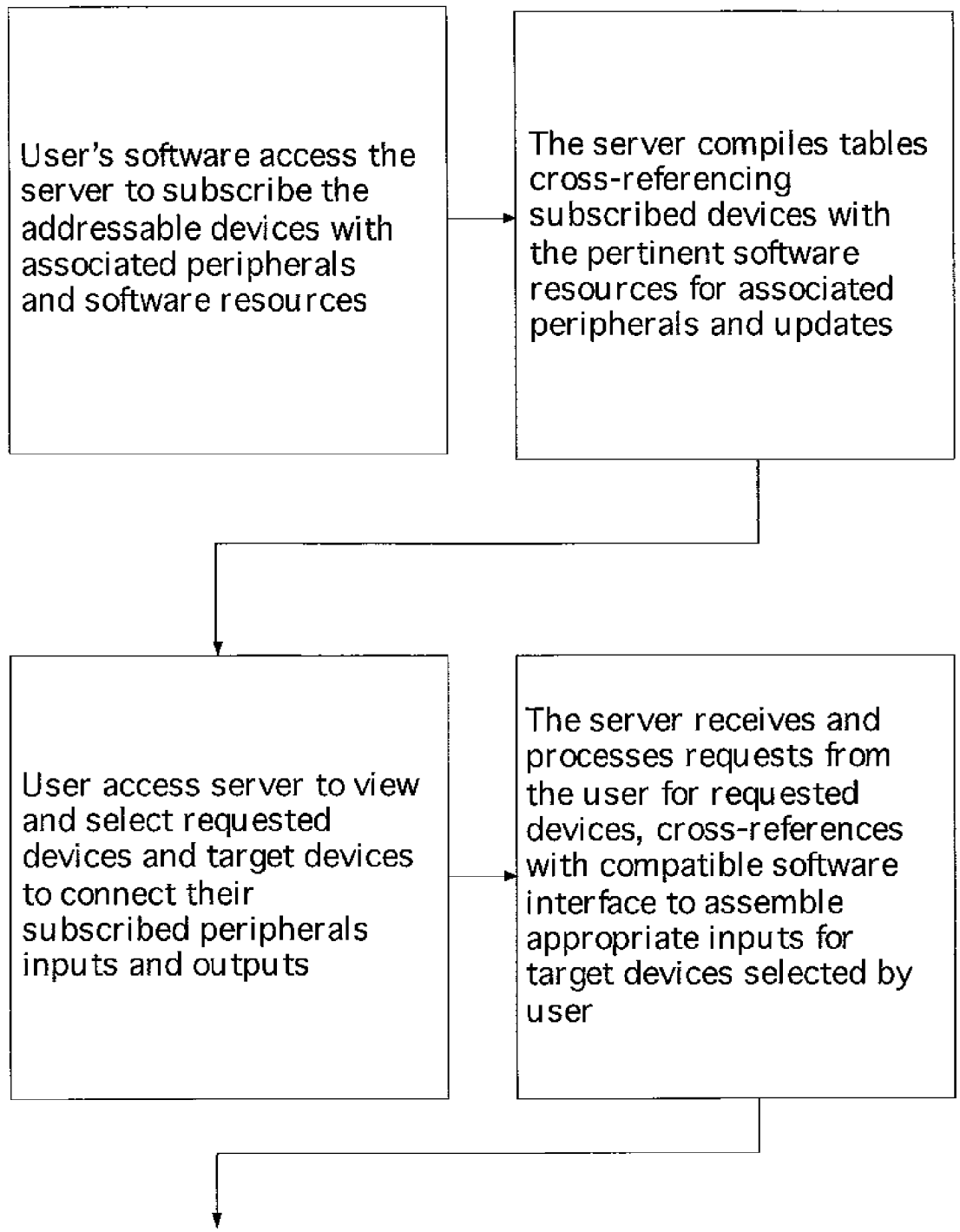
FIGS. 2 and 2A represent a flow chart listing the main steps of the process for using the present invention.
Figure 2A:
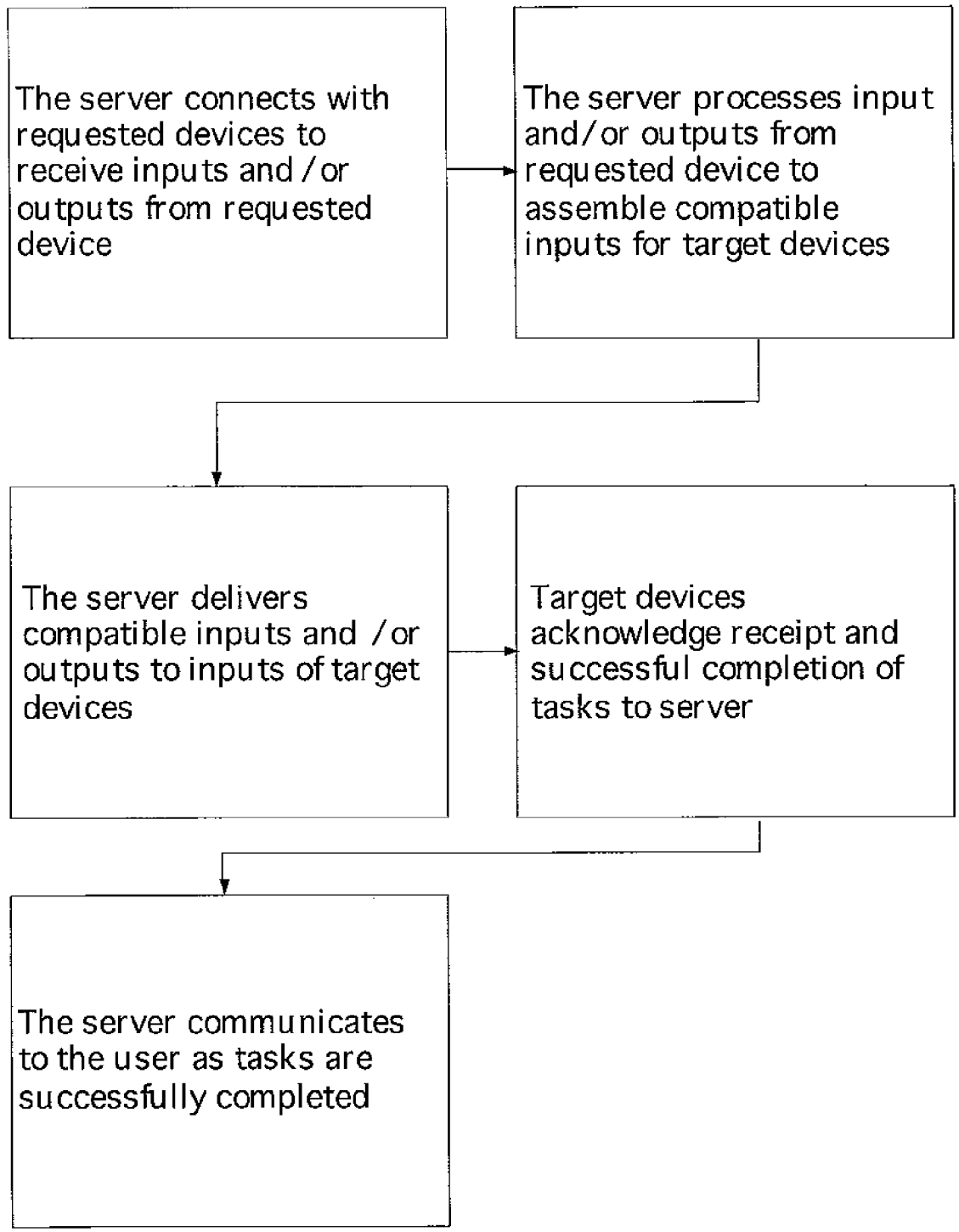
Figure 3:
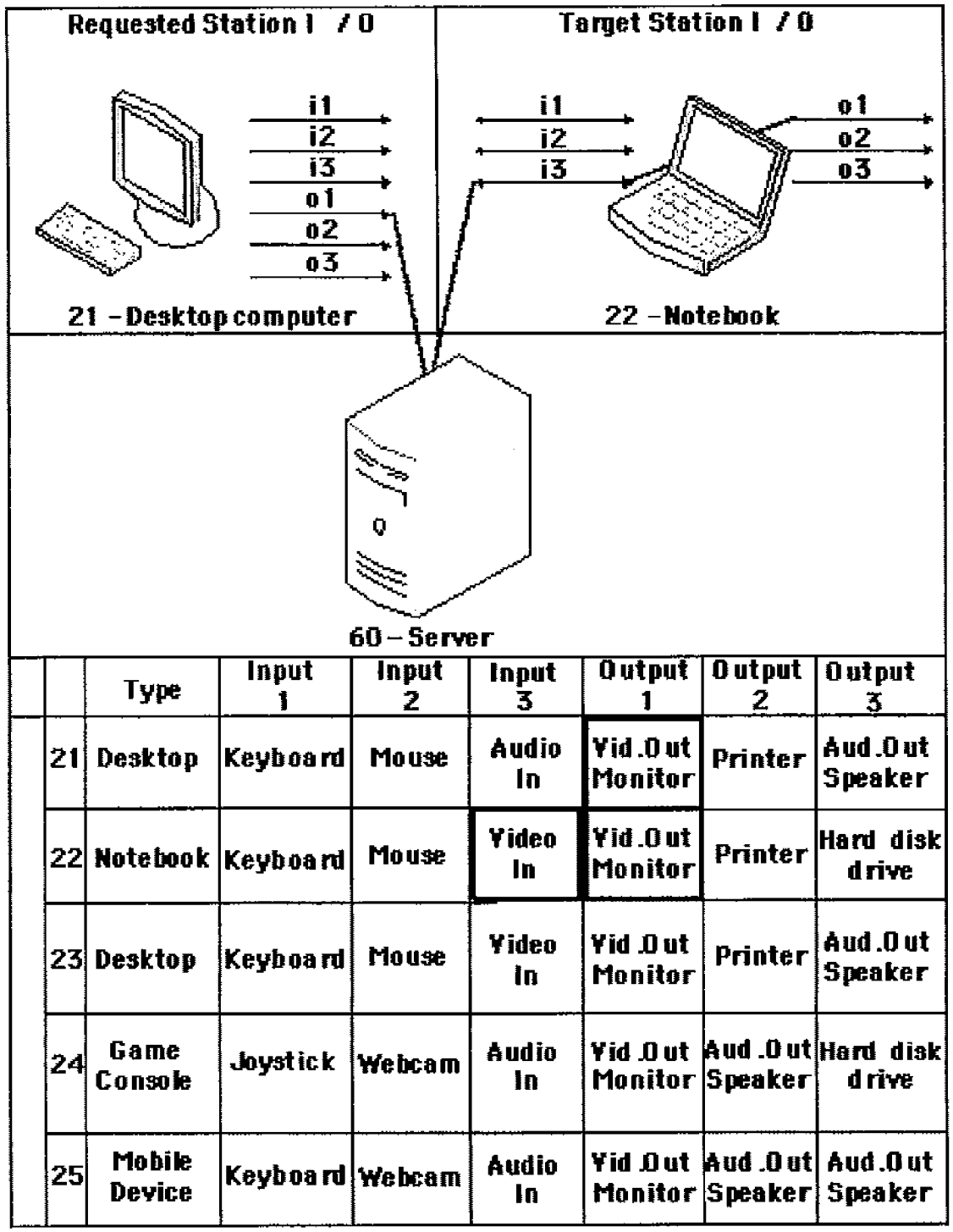
FIG. 3 shows a graphic representation for the system subject of this invention using icons for stations 21 and 22 and a table of some (five) of the subscribed stations for addressable devices. Requested device 21 (a desktop computer) shows its output o1 (monitor out) connected (through server 60) to input i3 (monitor in) and activating output o1 (monitor out) of target station 22 (notebook computer).

to input i3 (microphones in) and output o1 (audio out) of secondary target station 25 (mobile device) which is connected to input i2 (monitor video in), input i3 (audio in) and output o2 (a hard disk drive) of target station 22 (a notebook computer). Here a user utilizes a mouse in the requested device 21 to record video with intermediate device 24 and to record audio from intermediate device 25. The respective outputs of devices 24 and 25 are recorded by target device 22.

Figure 12:
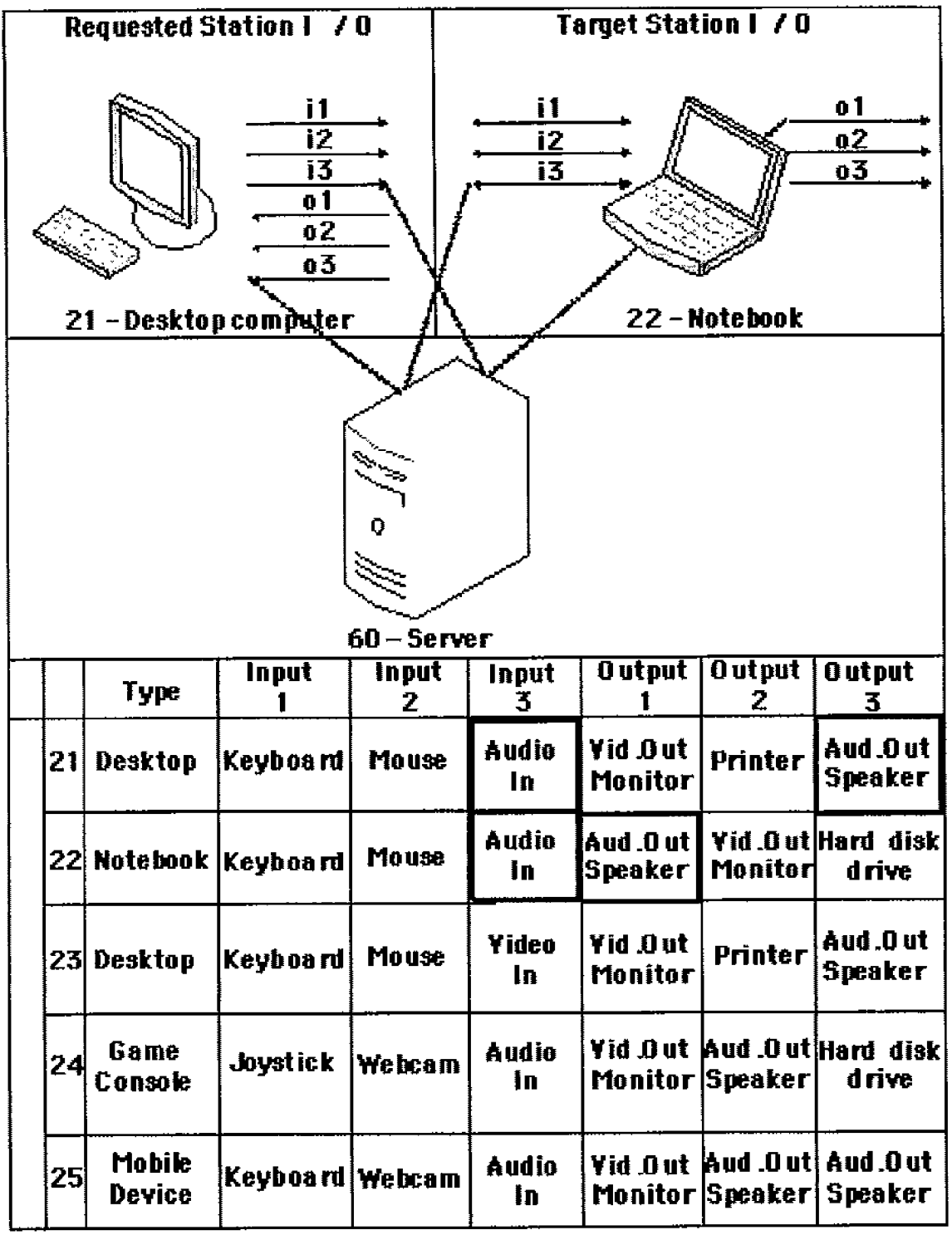

FIG. 12 shows a graphic representation using icons for stations 21 and 22. The input i3 (audio in) of requested station 21 is transmitted to target station 22 that plays it through output o1. At the same time, target station 22 transmits input i3 to requested station 21, which plays the audio through output o3. In essence, it establishes a two-way communication.

Figure 13:
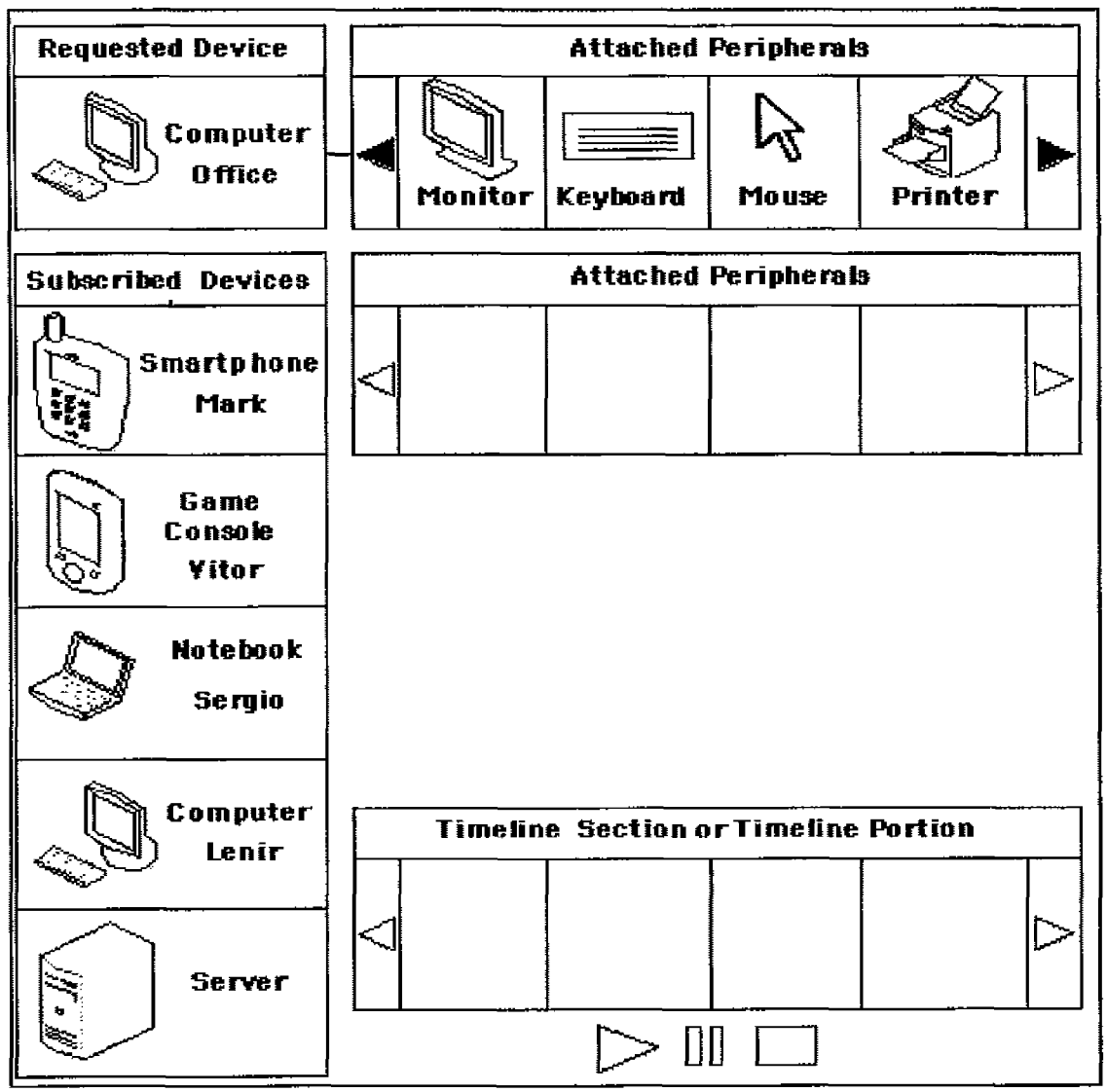

FIG. 13 represents an embodiment for a computer screen, as seen by a user in his or her station (whether or not it is subscribed to the system) that is utilized in one of the embodiments for the present invention. The icons for the subscribed stations with associated peripheral resources can be readily visualized and metaphorically represented and connected. In this figure, none of the subscribed devices have been selected.

Figure 14:
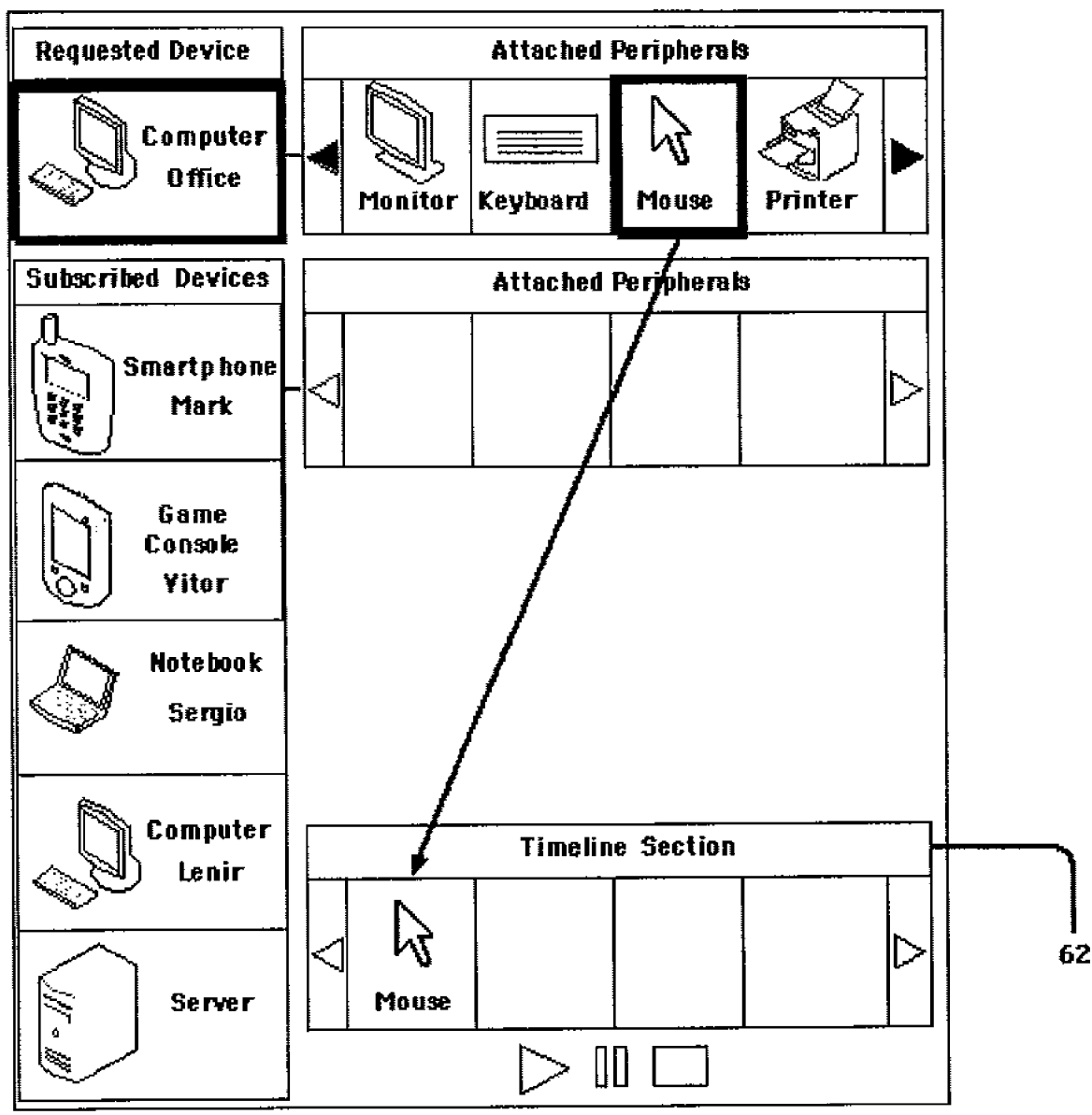

FIG. 14 shows the screen represented in the previous figure wherein an input peripheral, a mouse, has been selected and dragged to the timeline portion 62 of the screen.

Figure 15:
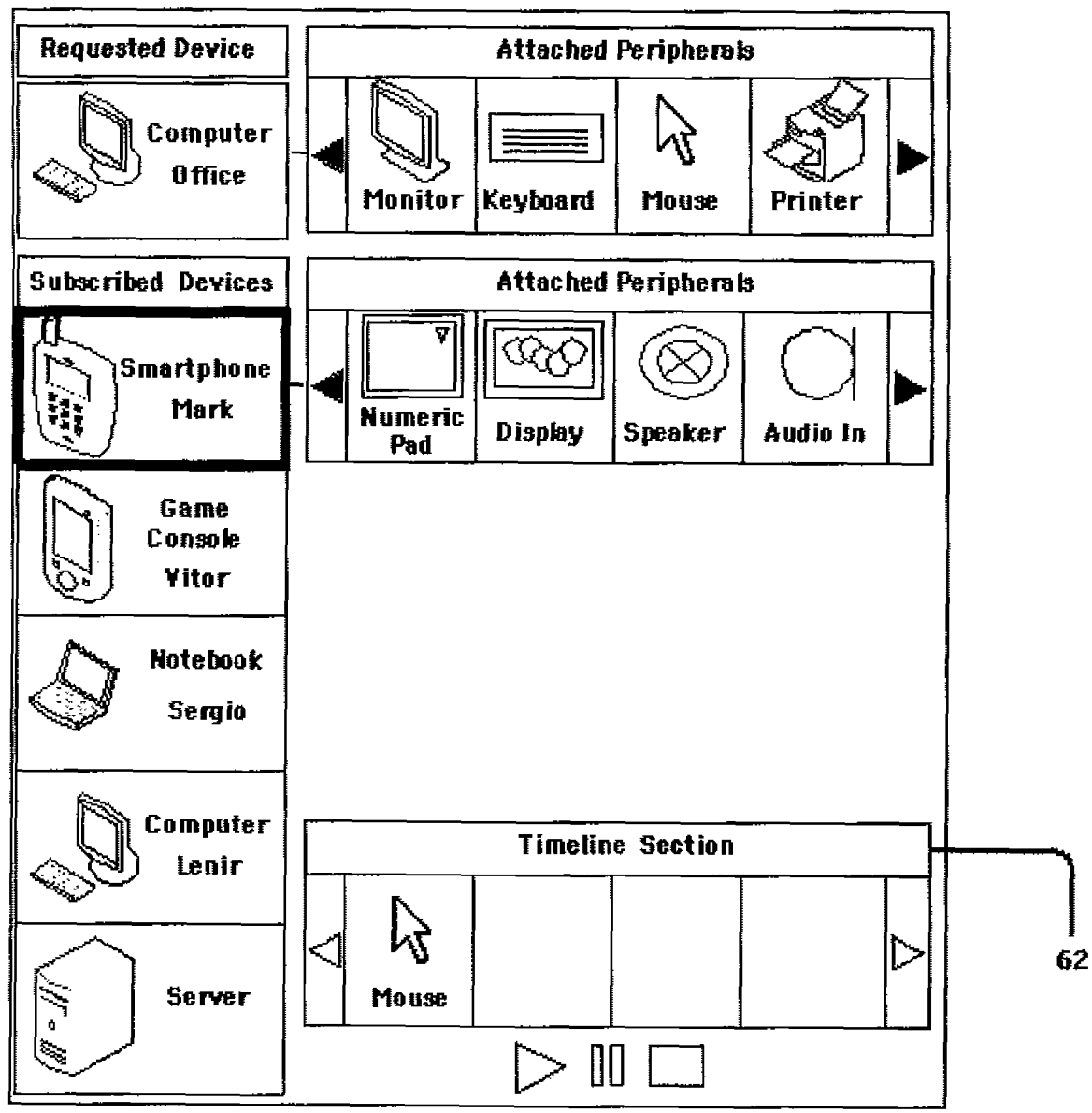

FIG. 15 shows the screen represented in the previous figures wherein a second (intermediary) subscribed station (Mark's smartphone) has been selected with its subscribed and reachable peripherals displayed.

Figure 16:
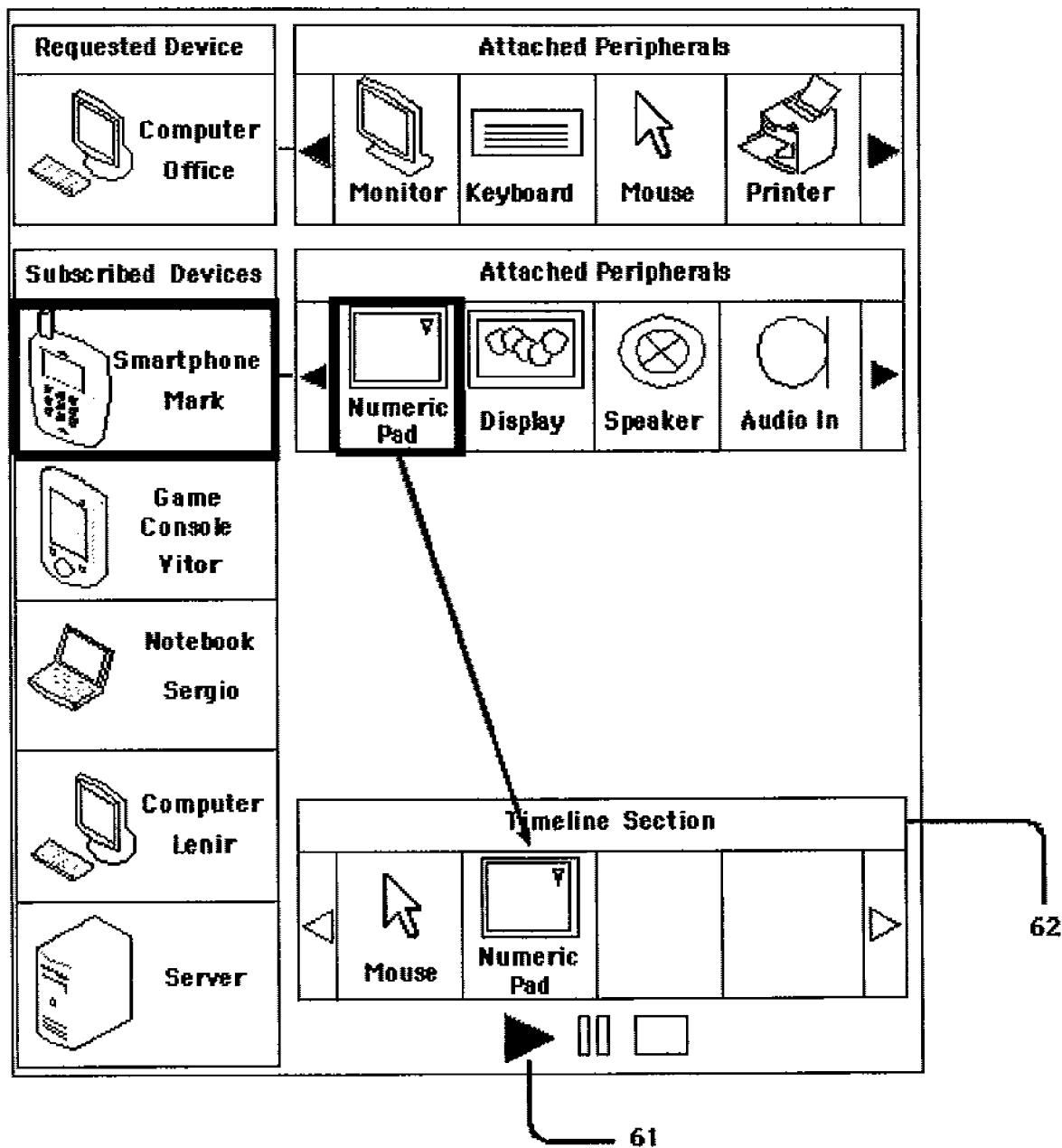

FIG. 16 shows the screen represented in the previous figures wherein the numeric pad input peripheral of the intermediary station (Mark's smartphone) is selected, dragged, and dropped in the timeline section of the screen initiating the validation process by the server's control software.

Figure 17:
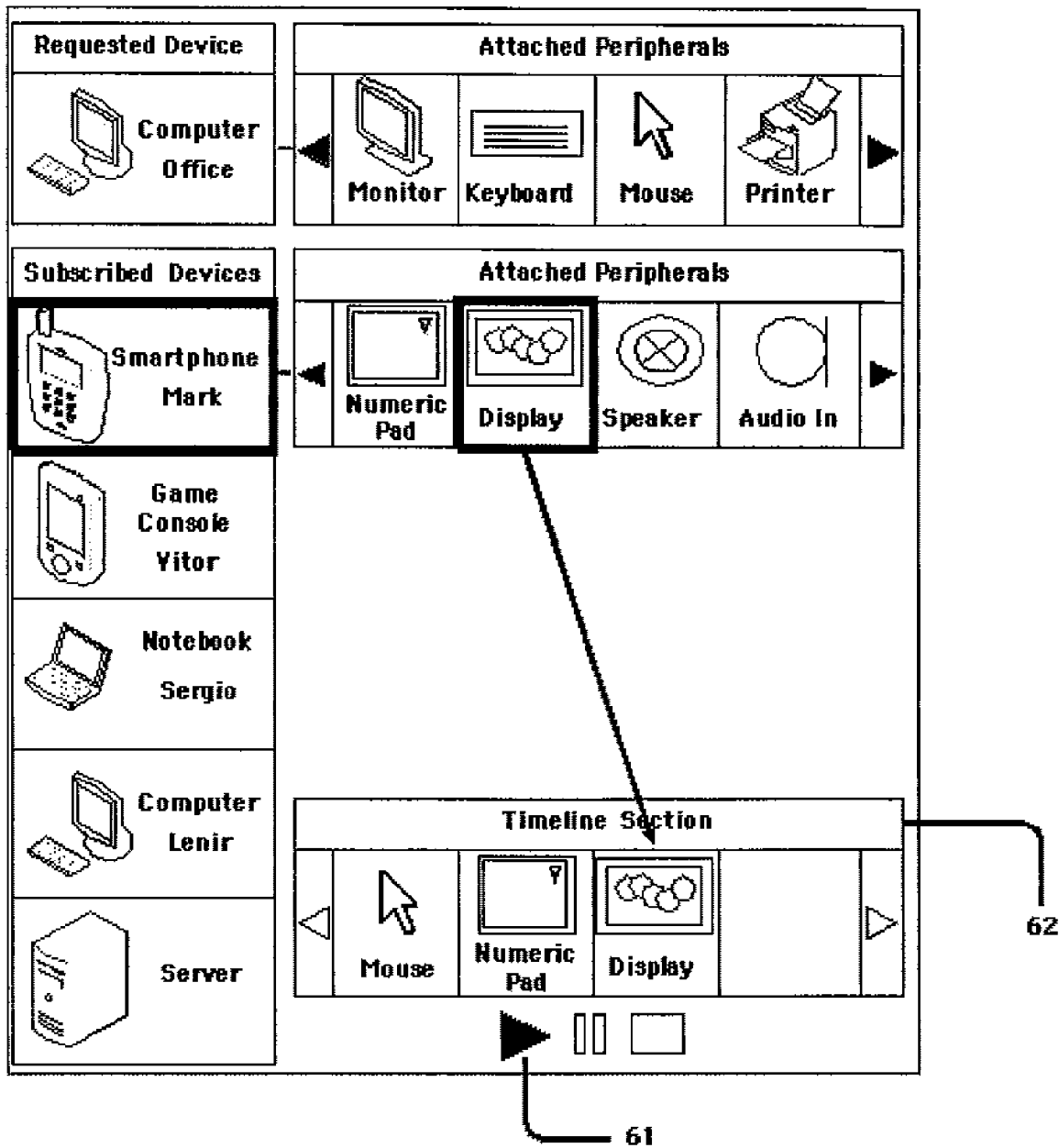

FIG. 17 shows the screen represented in the previous figures wherein an output peripheral, a display, of the intermediary station (Mark's smartphone) has been similarly selected, dragged, and dropped in the timeline section.

Figure 18:
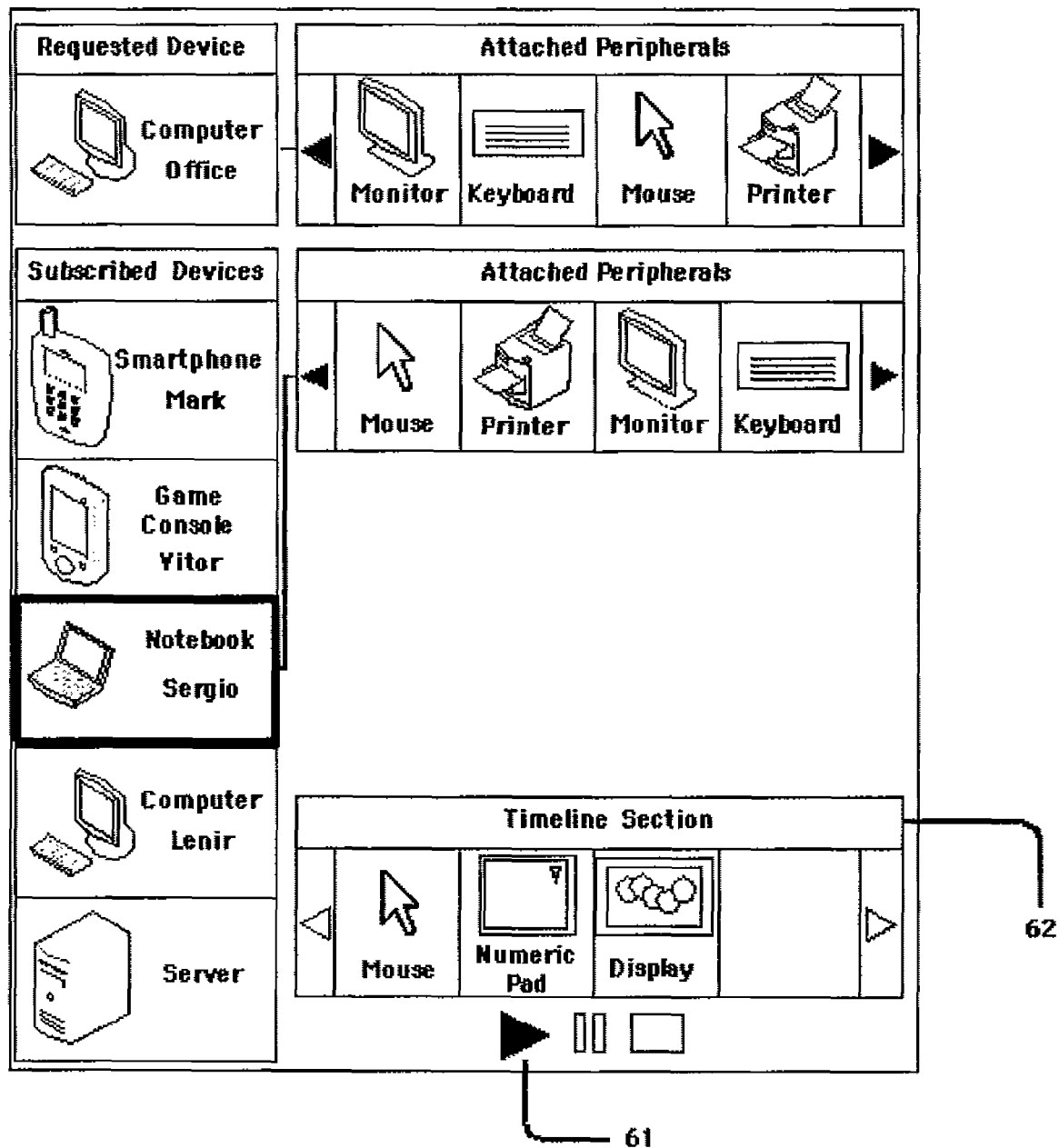

FIG. 18 shows the screen represented in the previous figures wherein a third subscribed station (Sergio's notebook), the target station, has been selected and its subscribed and reachable peripherals are displayed.

Figure 19:
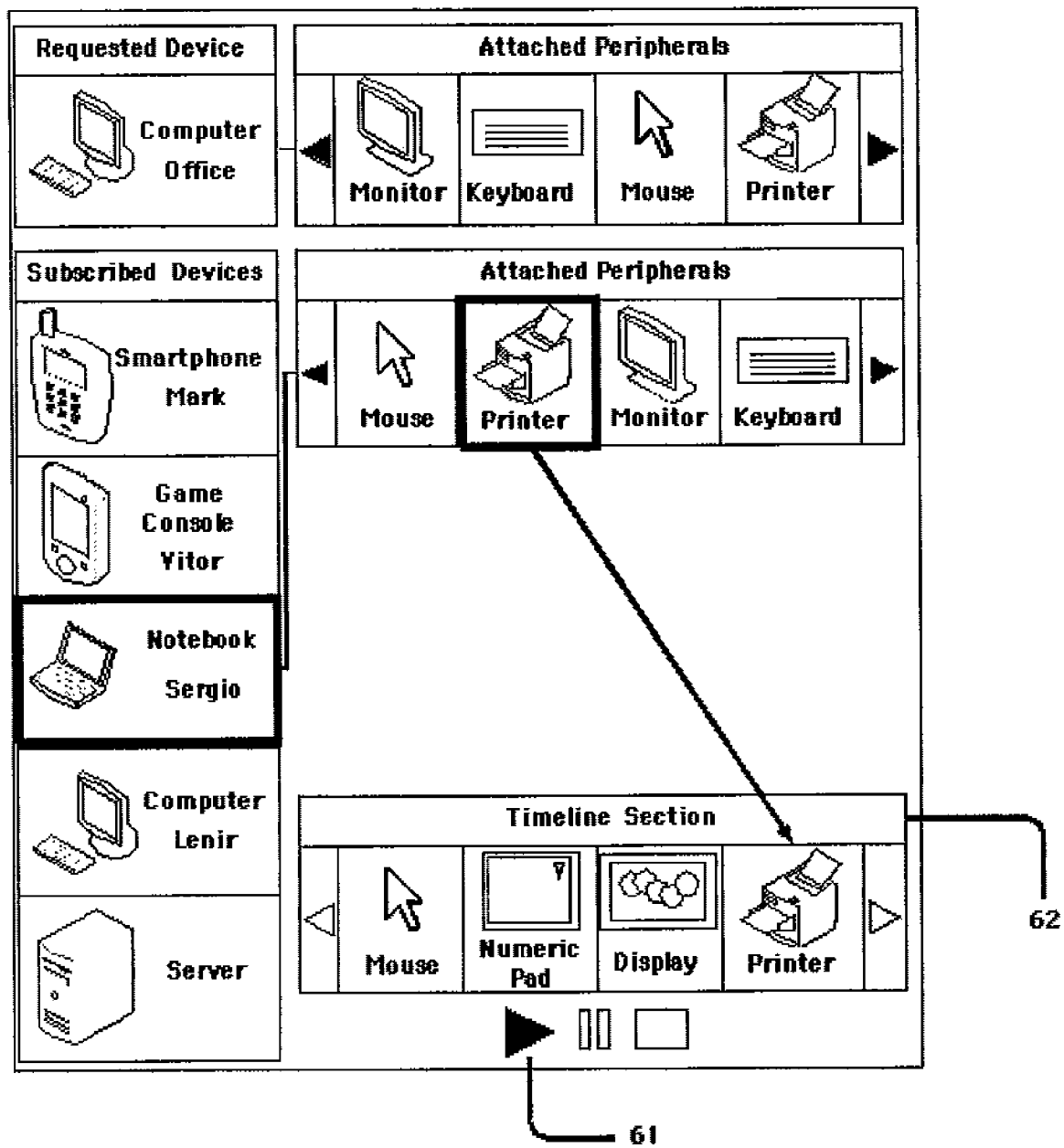

FIG. 19 shows the screen represented in the previous figures wherein an input device, a mouse, of the target station is selected, dragged, and dropped in the timeline section.

Figure 20:
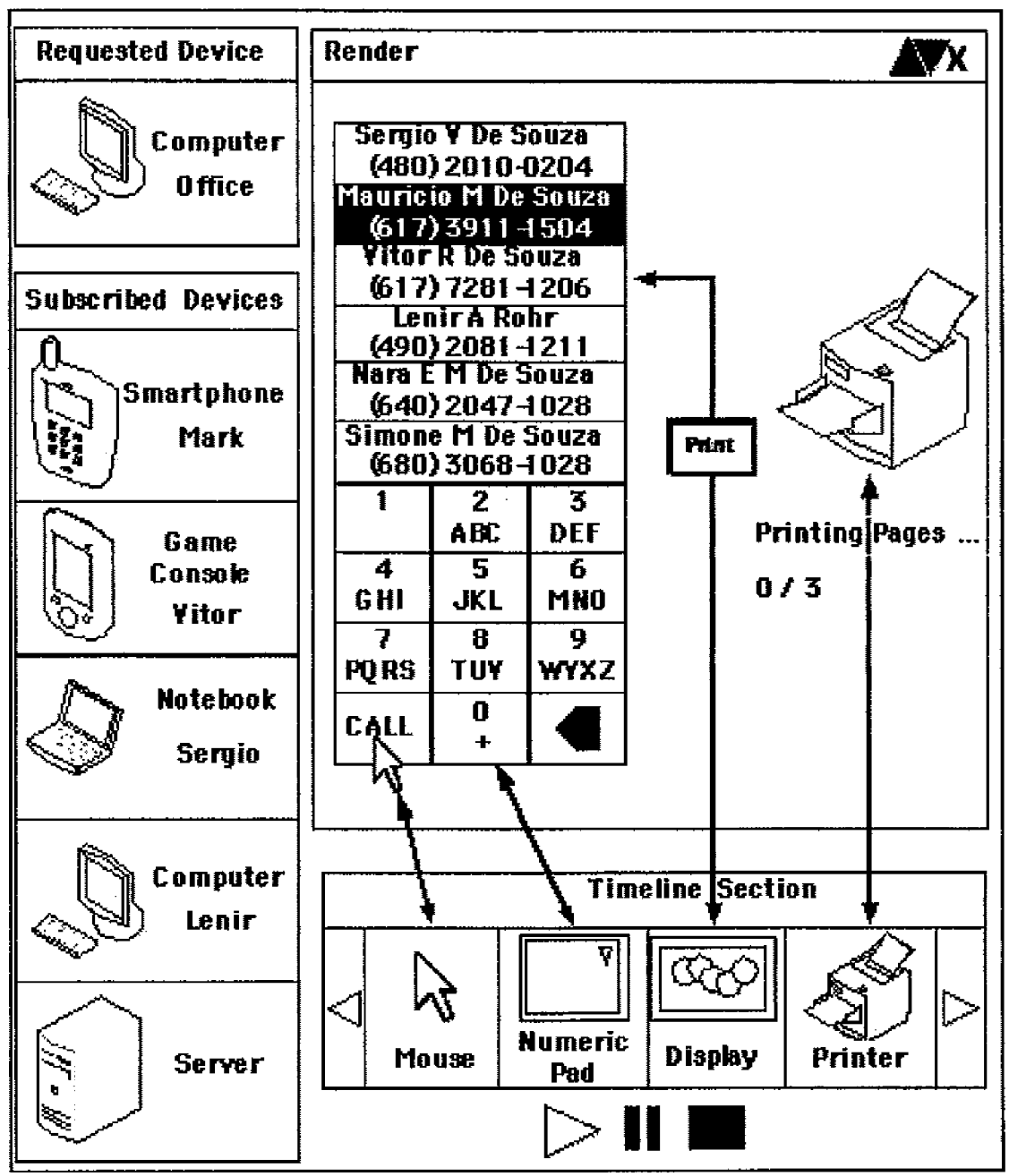

FIG. 20 shows the screen represented in the previous figures wherein the printer output peripheral of the target station is selected, dragged, and dropped in the timeline section of the screen.

DETAILED DESCRIPTION OF THE INVENTION

The present invention is generally referred to with numeral 10, it can be observed that it basically includes a network 20, computerized addressable stations 21; 22 as shown in FIG. 1, a user station 50 (with access to server 60), and a clearing house server station 60. As represented in FIG. 1, only two stations, 21 and 22, are subscribed to the software residing in server station 60. Station 60 includes sufficient computerized resources, including storage assemblies, to store the profiles for stations 21 and 22

For the purposes of this invention, the following terms will have the meanings described below:

Station or Device.
A device or station will be a computerized addressable device connected to a network, such as the Internet, or any other suitable network. A device includes a predetermined number of input and output ports to which peripherals are connected.

Subscribed Station.
A subscribed station is subscribed to the system when its profile is stored in the server. A subscribed station includes one device and at least one peripheral 30.

User Station.
A user station is a computerized device with access to network 20 and privileges to access the software in server 60 to operate system 10. A user station can also be used as a requested station or a target station at any time by a user if it is a subscribed station.

Input Ix.
It is the input port of a device to which an input peripheral (i.e. mouse, scanner, etc.) is connected. A virtual input (such as a virtual keyboard) will also be defined as an input peripheral, even if virtual.

Output Ox.
An output port of a device to which an output peripheral (monitor, printer, etc.) is connected. A virtual output (such as a virtual map) will also be defined as an output peripheral, even if virtual.

Peripheral.
A peripheral 30 is a hardware apparatus or software that is connected to an input, output or both. If connected to both, it will be considered as two peripherals, one for its connection to a device's input and the other one for its connection to a device's output.

Server 60.
The server in this invention acts as a clearinghouse for the different requests submitted by the approved users. Server 60 includes a database and preferably provides a website which can host content data and tools representing the subscribed stations and reachable peripherals.

User Station 50.
A user station is authorized to access the system's server 60. A user can access the system through a user-friendly browser or interface (GUI) provided by server 60. A user station 50 selects which of the subscribed stations will act as a requested station and which one(s) will be the target station(s). Intermediate stations will be considered requested stations.

Reachable Peripherals.
The peripherals in the subscribed stations that have been made available to the users of system 10.

Client's Software.
This is the software that resides in addressable stations, for example, stations 21, 22, 23, 24, and 25, that report to the server the inputs and outputs that the stations make available to system 10 along with information as to the peripherals connected to their inputs and outputs. Also, the client's software monitors the software resources of the station, such as the peripheral devices, and its updated versions, to periodically transmit this information to server 60.

Server's Software.
The software residing in the server includes tables for keeping the profiles of the subscribed stations with their peripherals and software resources. The server's software also maintains databases for the approved users along with passwords and other information.

This is a simplified system with only five stations for illustration purposes but a larger number of stations (2x, where "x" could be any number) can be subscribed limited only by the capacity of the resources of each server station 60. Server station 60 has for each station 21, 22, 23, 24 and 25 the profile that includes the reachable peripheral devices connected to their respective inputs 1x, such as keyboards, scanners, mouse devices, writing pads, and the like. The profile also includes the stations' respective and reachable peripherals connected to their respective outputs Ox, such as printers, fax, monitors, speakers, and the like.

Each station 21, 22, 23, 24 and 25 will have the ability to interact with server station 60 to cause one or more inputs Ix and one or more outputs Ox of a requested station to connect with the inputs of target stations. Stations 21, 22, 23, 24 and 25 are referred to as the requested stations when these stations' inputs and/or outputs are connected through server 60 to another requested station or target station. The stations with their inputs connected through server 60 to requested stations are referred to as target stations. A user station 50 using network 20 can access system 10 if issued the pertinent passcode. In one of the embodiments, user station 50 accesses server 60 through a website portal with user-friendly representations of stations that can be used as requested and target station.

Network 20 is implemented preferably through a global computer network such as the Internet. However, any other type of network would be equivalent provided it permits connection of addressable devices.

Figure 4:
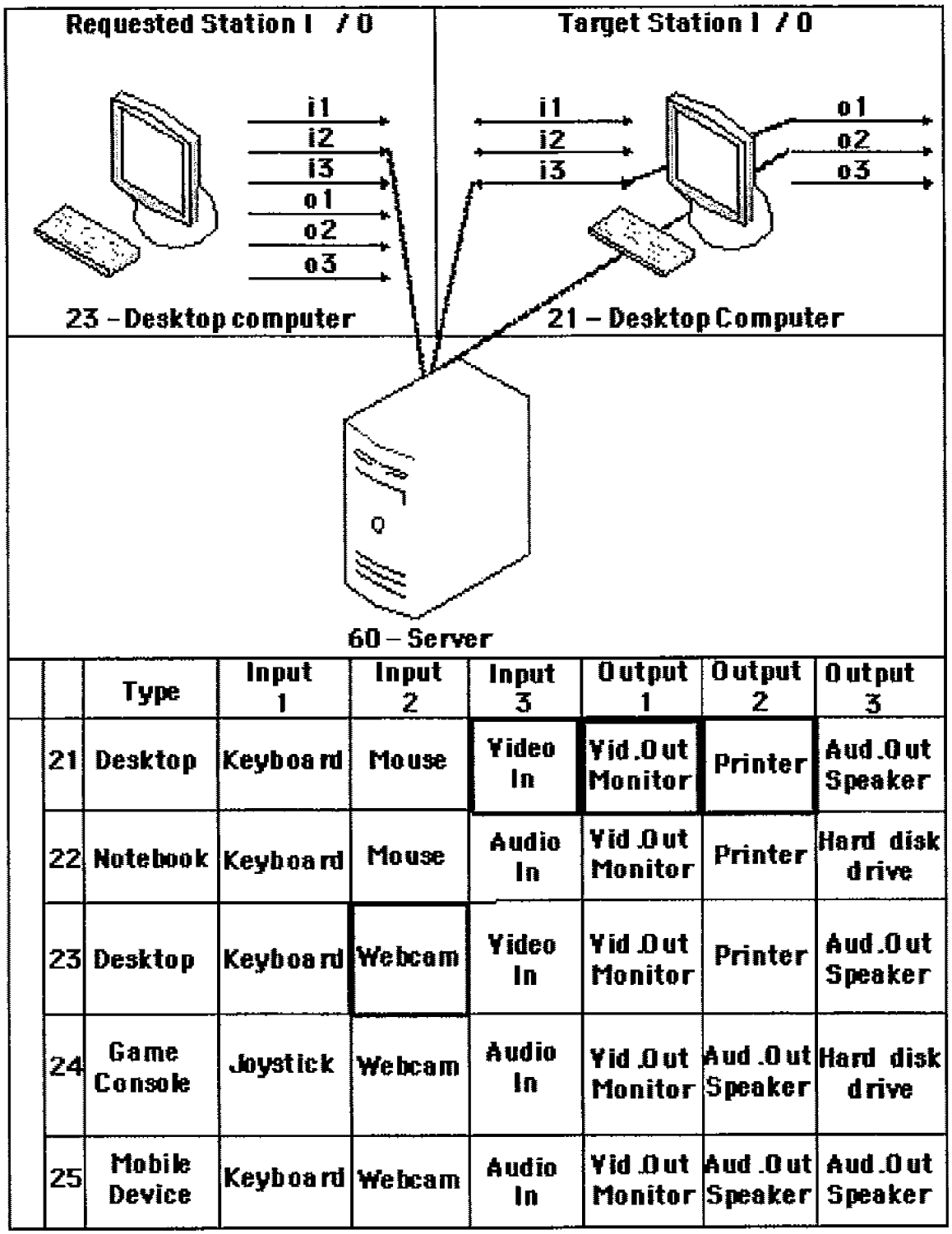
FIG. 4 shows the system using icons for stations 23 and 21. The input i2 connected to the output of a scanner (not shown) of requested station 23 (desktop computer) is connected (through sever 60) to input i3 (monitor in) of target station 21 (desktop computer) with its activated output o1 (monitor out) and output o2 (printer out) connected to the respective peripherals (not shown).
Figure 5:
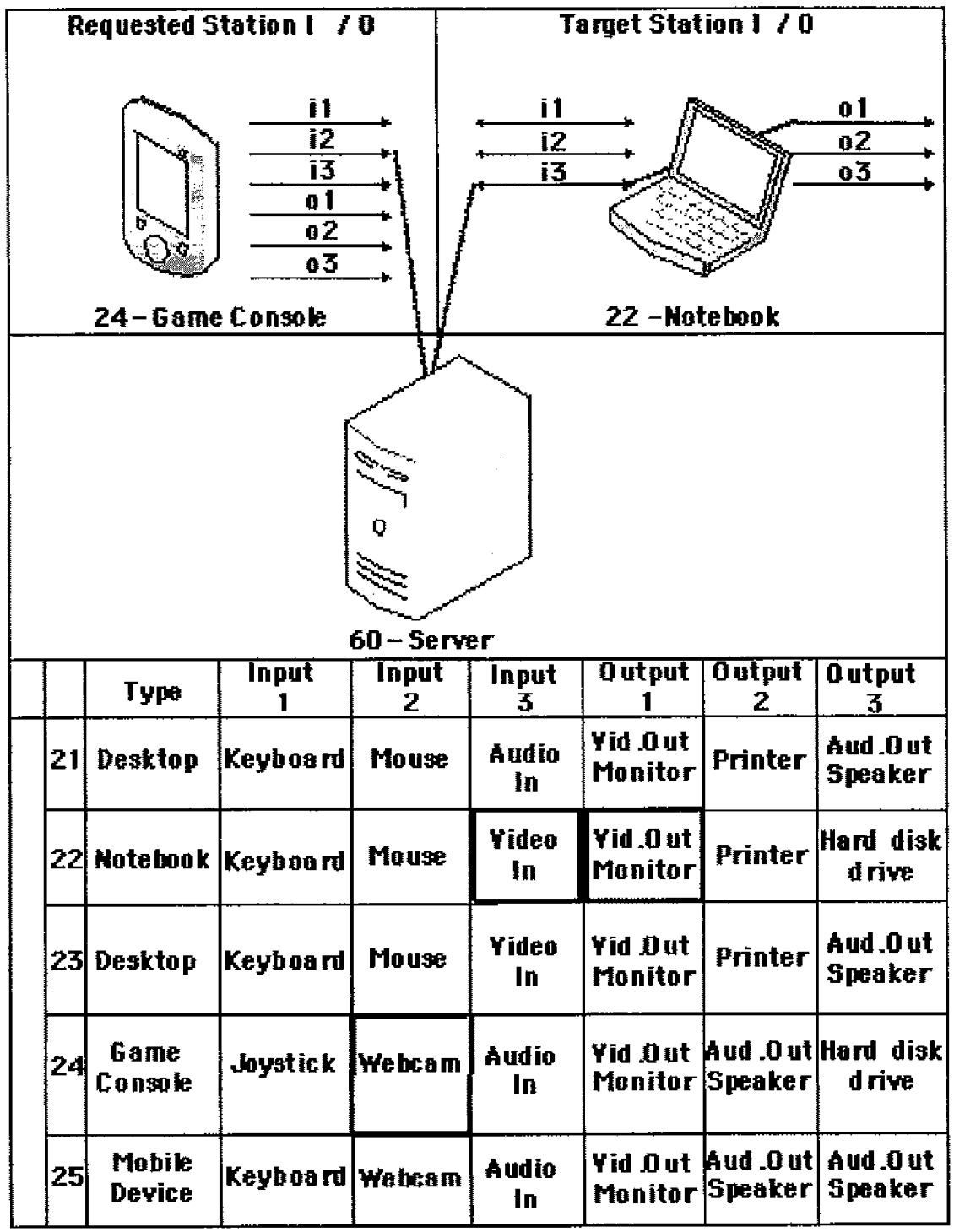
FIG. 5 shows the system using icons for stations 24 and 22. The requested station 24 (game console) shows its input i2 (connected to the output of a webcam input peripheral) connected (through server 60) to input i3 (monitor in) and activated output o1 (monitor out) of target station 22 (notebook computer).
Figure 6:
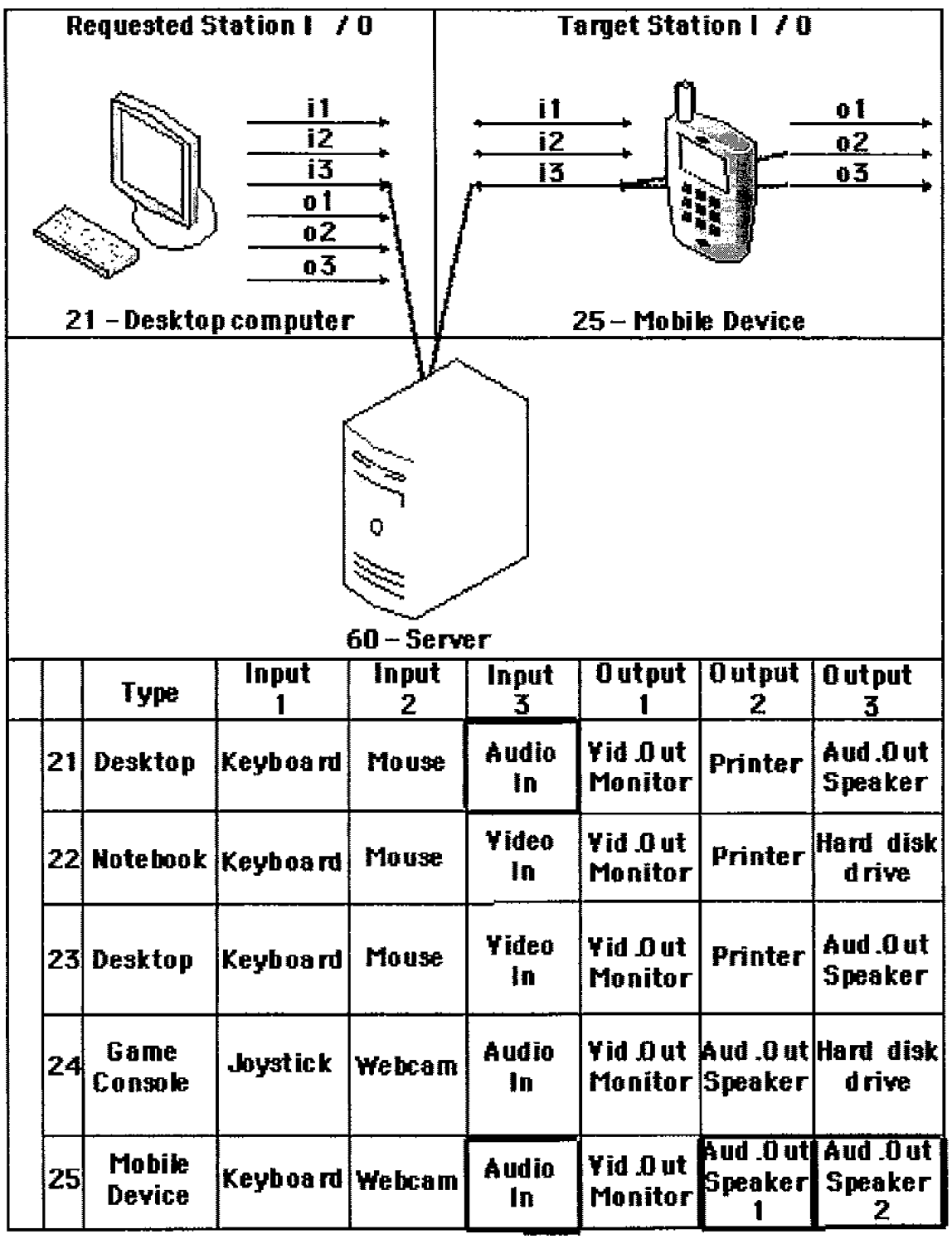
FIG. 6 shows the system using icons for stations 21 and 25. The requested station 21 (desktop computer) shows its input i3 connected to a microphone (not shown) and connected (through server 60) to input i3 (audio in, not shown) of target station 25 (a mobile device) to generate an output signal at output o2 (audio output for the target station's speakers, not shown).
Figure 7:
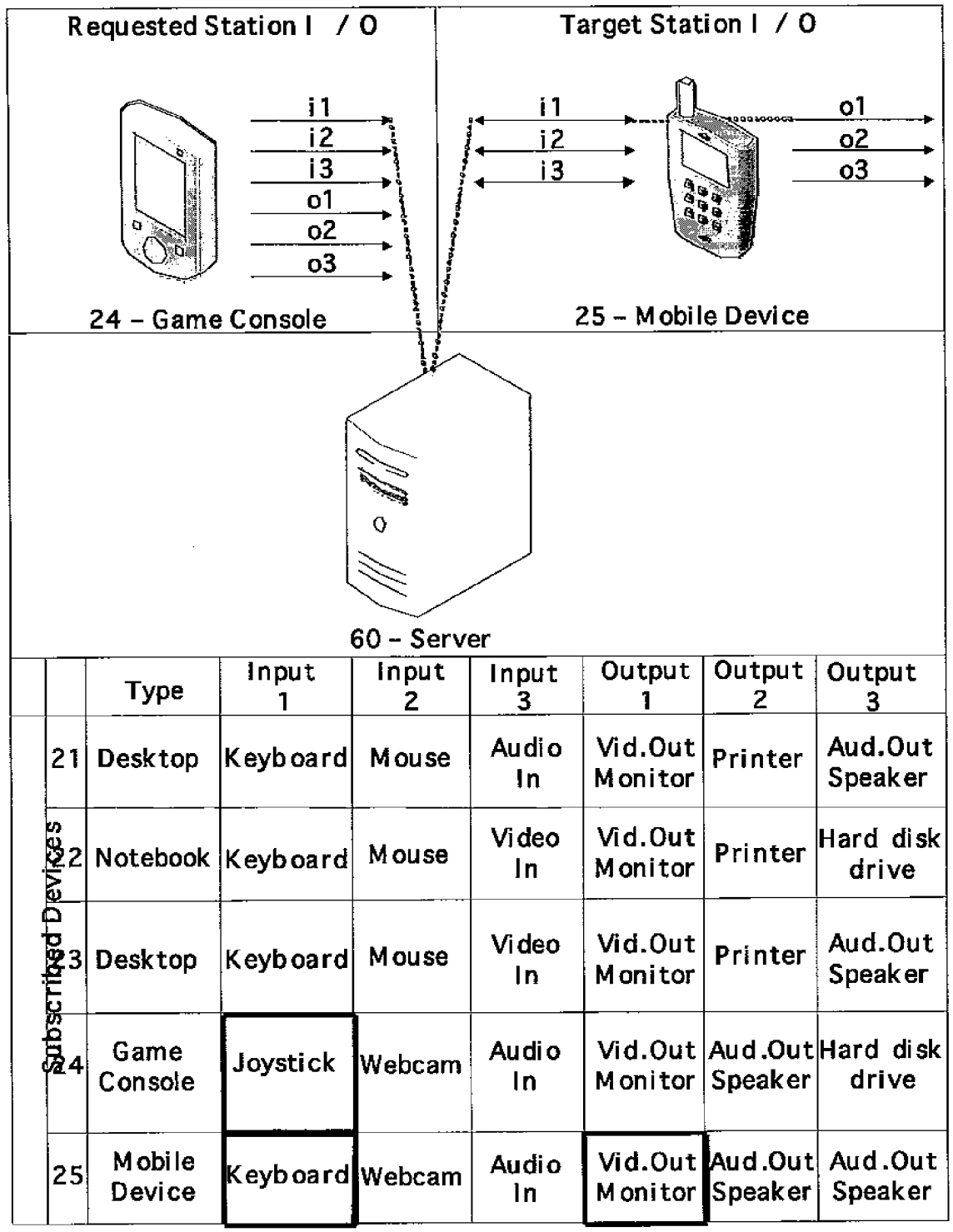
FIG. 7 shows the system using icons for stations 24 and 25. The requested station 24 (game console) shows its input i1 (connected to the output of a joystick) connected (through server 60) to input i1 of smartphone 25 to activate output o1 (flat screen) of target station 25 (mobile device). Requested station 24 will be provided by server 60 with suitable graphic user interfaces to permit the user of station 24 to accurately operate the joystick.
Figure 8:
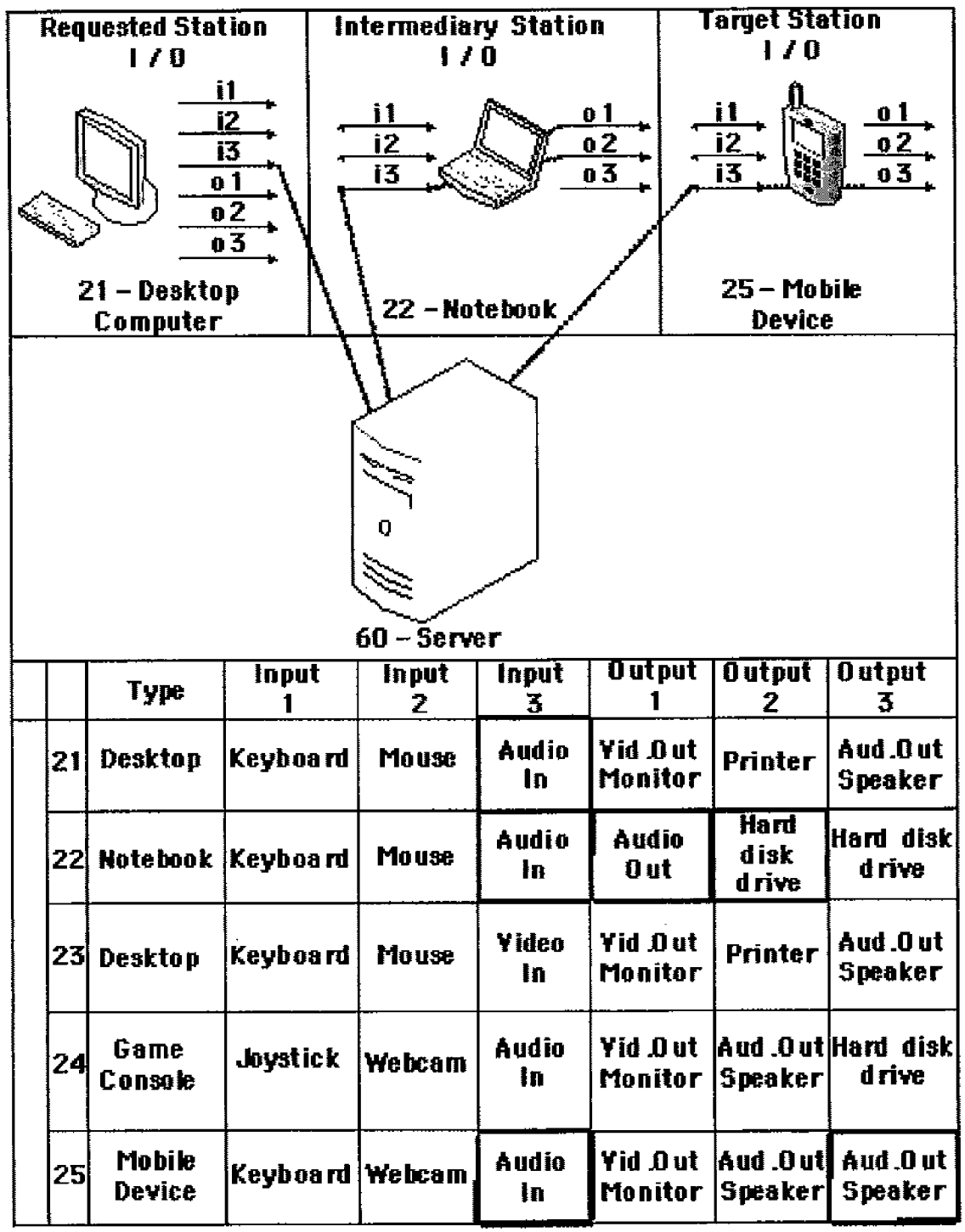
FIG. 8 shows the system using icons for devices and table of subscribed addressable devices with the requested station 21 (desktop computer) selected having its input i3 (microphone in or audio out) connected (through server 60) to input i3 (audio in), output o1 (audio out) and output o2 (to store the sound on a hard disk drive) of intermediary station 22 (notebook), and simultaneously to input i3 (audio in) and activated output o3 (speakers) of target station 25 (mobile device). The net result is for a user operating requested station 21, recording his/her voice in station 22 and simultaneously transmitting his/her voice to station 25's output speakers.
Figure 9:
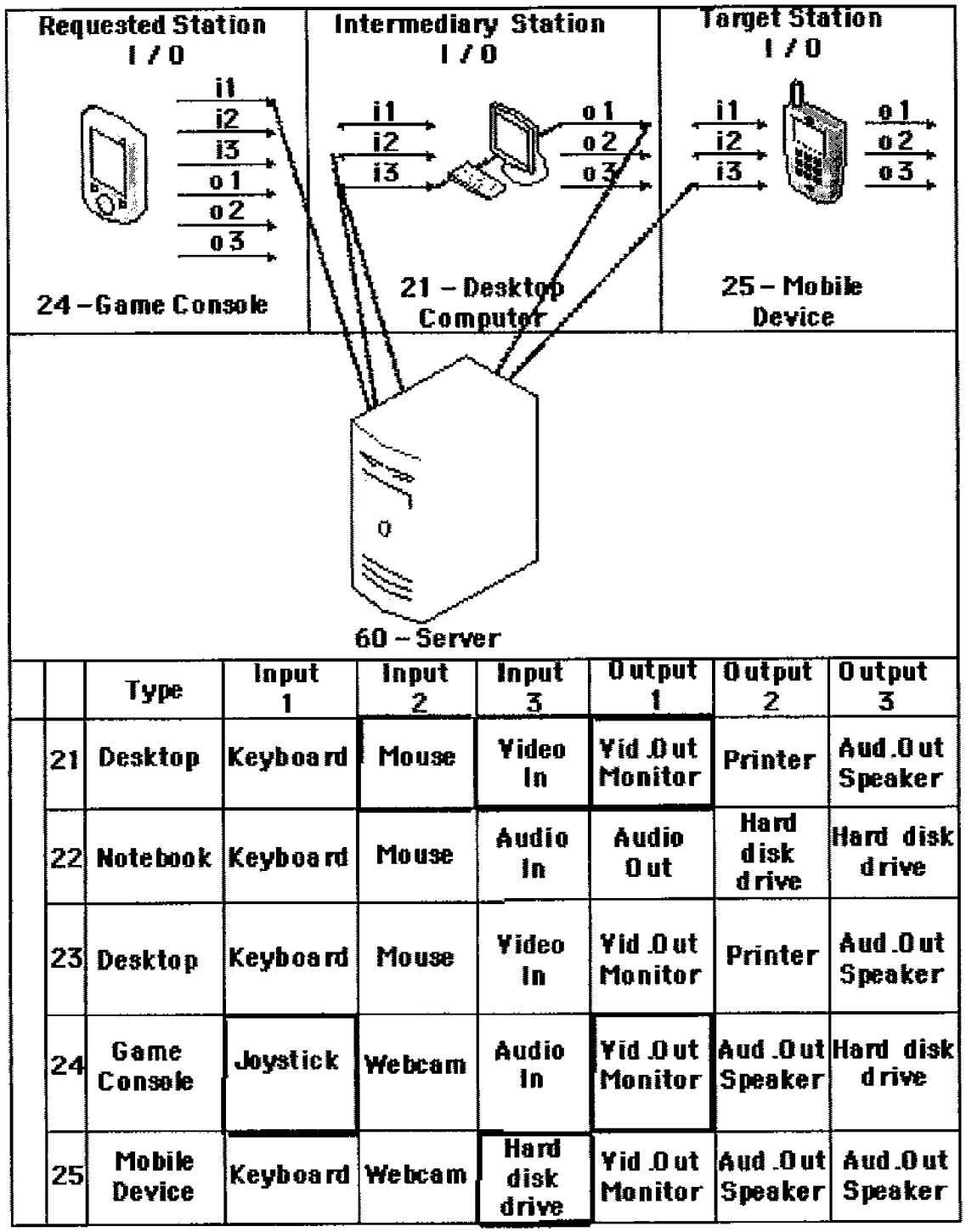
FIG. 9 shows the system using icons for stations 24, 21 and 25. The requested station 24 (game console) shows its input i1 (joystick) connected (through server 60) to input i2 (mouse), input i3 (monitor in) and output o1 (monitor out) of intermediary station 21 (desktop computer), transmits (through server 60) to input i3 (hard disk drive) of target station 25 (mobile device). In this configuration, server 60 will have the necessary software to support the requests from target stations 24 and intermediary station 21.
Figure 10:
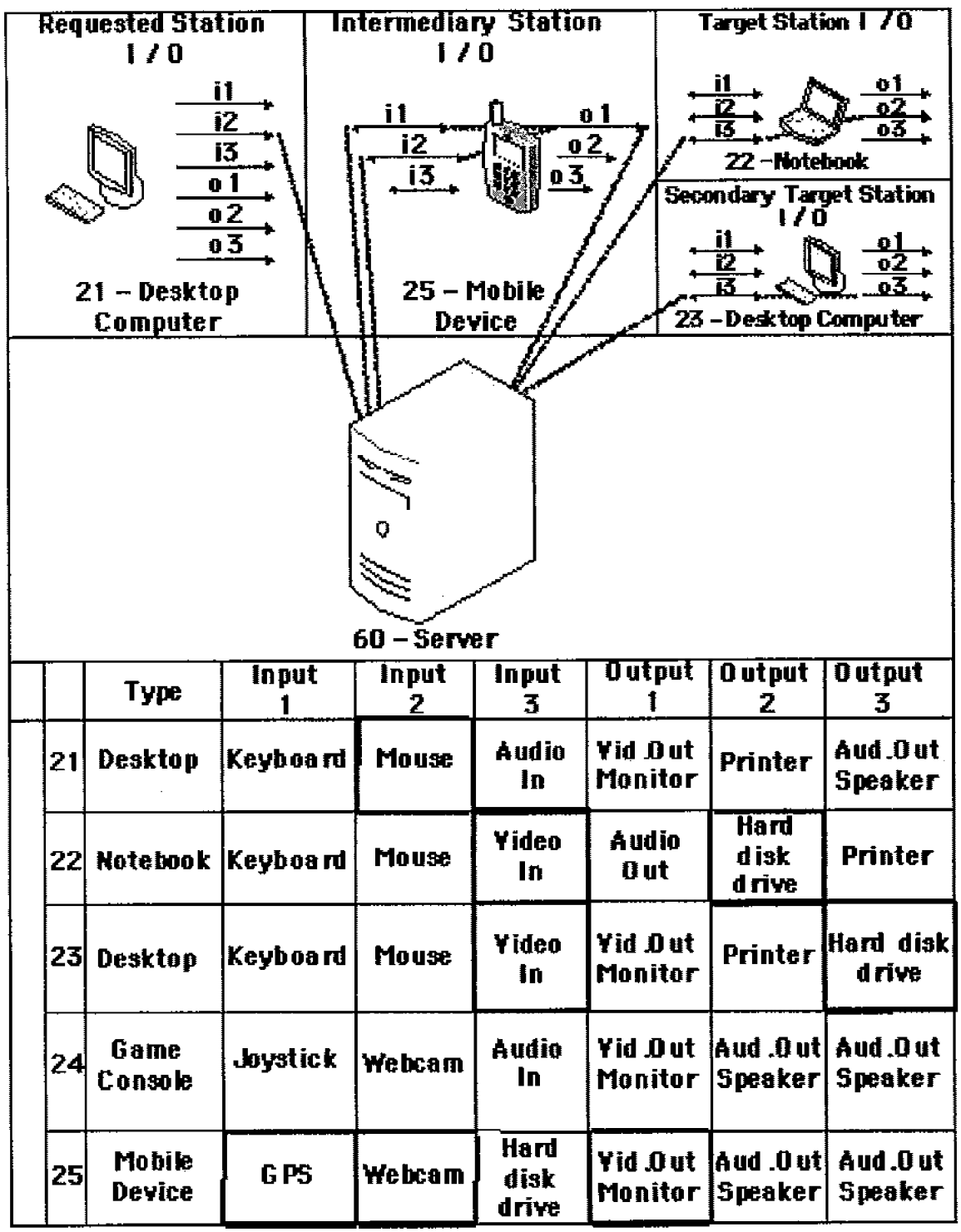
FIG. 10 shows the system using icons for stations 21, 25, 22 and 23. The requested station 21 (desktop computer) shows its input i2 (mouse) connected to input i1 (GPS), input i2 (webcam), and output o1 (monitor) of target station 25 (mobile device), which are connected (through server 60) to inputs i3 (monitor in) and enabling outputs o2 (hard disk drives) of target stations 22 and 23 (notebook computers). In this configuration, a user operates the mouse of requested station 21 to actuate intermediary station 25's GPS and webcam. The monitor output is transmitted to server 60, which in turn transmits simultaneously to stations 22 and 23 for recording the output from the monitor out.
Figure 11:
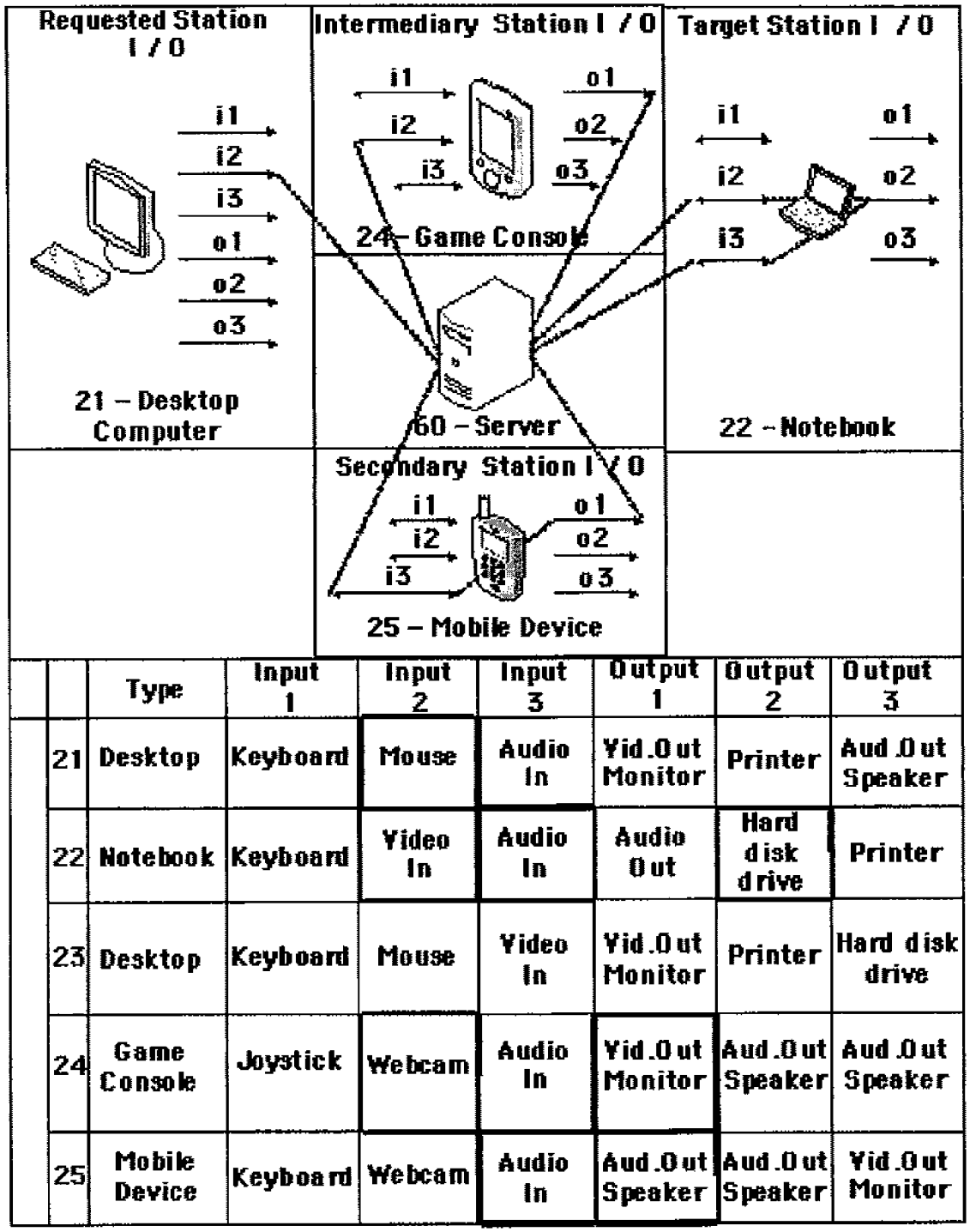
FIG. 11 shows the system using icons for stations 21, 24, 25 and 22. The requested station 21 (desktop computer) shows its input i2 (mouse) connected (through server 60) to input i2 (a webcam) with output o1 (monitor video out) of intermediary station 24 (game console) connected (through server 60)

Peripherals 30 include any apparatuses y3x (where "y" refers to a station to which the peripheral is connected and "x" refers to a peripheral number) that have at least one input y3x' and at least one output y3x". Examples of peripherals include keyboards, mouse devices, faxes, speakers, monitors, scanners, printers, joysticks, writing pads, and the like. Virtual peripherals are also included. For example, a scanner is connected to input i2 of device 23. See FIG. 4. In this case, the scanner is considered an input peripheral with its output connected to an input port i2 of device 23 (a desktop computerized station). Similarly, a printer, for example, is an output peripheral with the printer input connected to output o2 of device 21, as seen in FIG. 4.

Server station 60 includes software with programmable databases 70 that includes the hardware and software resources of each station 2x and reachable peripherals. The term 2x includes stations 21; 22; 23, etc. The characteristics of the hardware and software resources will include information regarding the drivers and updates for each peripheral and will be stored in databases 70. Peripherals 30 are connected directly to network 20 also through computerized stations 2x. Furthermore, server station 60 can also be included as a requested station and/or target station should a user choose to transmit data and store it to a server station 60.

Since different devices operate with different operational systems, the server needs to identify the hardware it is accessing to redirect the site to the correct software download. For instance, a device might have a Windows OS, Windows Mobile Edition, Mac OS, iPhone/iPad OS, or a Linux based OS.

Different operational systems have different ways to compile and link objects with the need to have the same resources and functions, but for different operational systems.

The software download will include:
executable software that will basic handle GUI (graphic user interface) directly or by accessing the server's web site;
libraries to make connections work between different subscribed devices and access the drivers for reachable peripherals; and
audio, video, and images with compression and decompression software.

Each device is registered or subscribed with server 60. Once a subscribed station 2x downloads the tools, the installation will start.

The first thing that needs to be done is to install in each subscribed station or device a service software, which is software that starts automatically when the device is booted. The reason for this service to be installed is that it is going to be responsible for sending crucial information to the server, like its address (i.e. IP or internet protocol address).

Then communication is established so that when a device boots up it will automatically update its IP address in the server's IP list (database 70) and register this IP address in its own memory. If for some reason the device changes its IP address, the service will check if the new IP address is different from the old one registered in memory. If it is, it will update the server with the new IP address. The service at station 2x will also act as a "mini server" so a user can, at any time, "wakeup" the station by the server. Each device 2x will act as client and server at the same time. For this to work, server 60 needs to have a fixed IP address so that each device knows "where" to look to update its IP address in the server's database 70. Once server 60 knows the device's IP address, server 60 can connect back to device 2x that is waiting for that connection. This is why it will also act as a "mini-server". The connection is synchronous since, otherwise, the user would need to set a timer to each device to check from time to time if the device is needed (asynchronous way).

Once a device 2x knows is requested, a library (preferably written in a low level language, such as Assembly or C/C++) will identify every reachable peripheral connected to that device. The list of reachable peripherals is sent to server 60 for distribution to the requested device(s). The GUI (either a downloaded application or a web browser) permits a user to connect peripherals from different subscribed stations 2x.

Once each subscribed station, and its peripherals, is listed on the GUI of the requested device, the user will start the connections using the available inputs and outputs of reachable peripherals in each station.

For every connection attempt, the server will check if the connection is possible. For instance, the user can't connect the microphone to a printer, so if the user tries to drag and drop a microphone from the requested computer and drag and drop a printer from the remote device and start the connection, the server will identify that this connection is impossible at that time and it will refuse it. But if the user has a STT (Speech To Text) software running in our server, we can make this connection available to the user.

The following example is representative of the way the system works:
A) User selects the microphone at the requested device and selects the printer at the target device. It activates the connect/play button. After that, a string of characters will be shown with the following:
a string asking the server if the connection that is being requested by the user is possible: ?
requested peripheral at the requested device; in this case it is going to be the microphone at the office computer: |OFFICE_PC|MICROPHONE
target peripheral at the target device; in this case it is going to be the printer at the home computer: |HOME_PC|PRINTER|
and an ending string: ?
So at the end the string will look something like this:
?|OFFICE_PC|MICROPHONE|HOME_PC|PRINTER|?
The string will be sent to the user's server, and the server will:

1) break the string in pieces to check if the connection is possible, considering that the user has a STT in the server. The libraries will have already checked that the user has the microphone connected in the requested device (office_pc) and that the printer is connected in the target device (home_pc). The server will only check if the server can handle the connection between the microphone and the printer: MICROPHONE?PRINTER.
2) check the string with the user's database; in this case, the result is going to return "success".
3) a new string will be sent from the server to the requested device (office_pc), saying that the connection can be completed: !|SUCCESS|! Otherwise it would return !|FAILED|!

Once the device receives the SUCCESS notification, the connection can be completed.

The user will open the microphone and start to record the audio to a data buffer. Once the user is satisfied, he/she can hit the stop button. This audio buffer will be converted to a new buffer and this new buffer will have the original audio buffer, but it will be compressed using an audio codec available from the requested device (office_pc).

The compressed audio buffer will be sent to the server that will have the same codecs (compression and decompression) as the downloaded ones from the user.

The compressed audio buffer is decompressed by server 60. The user will then have a new data buffer with the original audio from the requested device (office_pc). This new data buffer will feed the STT application and transform it to another buffer, but this time, it will be a text data buffer.

Now server 60 will:
1) build a new string to be sent to the requested device (home_pc), notifying it to execute an order: !|RENDER
2) notify the requested device (home_pc) which attached peripheral will handle the information (data buffer) that it is about to be received: |PRINTER
3) add to this string the text data buffer itself: <DATA_BUFFER>|
4) an ending string: !

So at the end the string will look something like this: !|RENDER|PRINTER|<DATA_BUFFER>|!

Now each user station 50 will have a receive this string, break it into pieces, and collect the crucial information, namely, the peripheral that is going to be used (in this case a printer) and the data buffer (this data buffer will feed the printer driver in the target computer). When the printing thread is done, the target device (home_pc) will send a string back to the server noifying that it is ready for a new connection.

!|RENDER|PRINTER|SUCCESS|!

When server 60 receives this string it passes to the requesting device 2x (office_pc), notifying it that the application is ready for a new connection. Other variations in the strings to request and provide similar information for the user are considered equivalents.

One embodiment in the present system includes the use of a graphic user interface (GUI) in a screen to represent the different addressable stations or devices 2x and available peripherals connected to each of the devices or stations. As it can be seen in FIG. 13, the leftmost portion shows different stations 2x in vertical alignment. And the uppermost station corresponds, in this figure, to a computer named "Computer Office", that was previously selected, and is referred to as the "Requested Device" or "Requested Station". The selection can be accomplished with one or more clicks or in any other conventional manner (such as bringing a curser over an object or pressing a metaphorical button, etc.). Once a station is selected, the different peripherals that the station's owner has made available to the system are displayed horizontally to the right of the box representing "Computer Office". A user accessing server 60, where the software to access and control the subscribed stations resides, can then select one of the peripherals made available to the system by the subscribed member. The horizontal band where the peripherals are displayed includes scrolling arrows to view other peripherals that did not fit in the allocated space.

In FIG. 14, the input device selected, a mouse, is dragged and dropped in what is called a "Timeline Section" and the representative icon then appears therein. With this action a user has selected a particular input peripheral of the requested station.

FIG. 15 shows the selection of "Mobile Phone Mark", as an intermediary station, with its pertinent peripherals displayed. In FIG. 16, a user selects the "Numeric Pad" peripheral, drags it and drops it in the "Timeline Section". At this point the system checks the validity of the connection. If valid, a play triangle 61 appears or is displayed. Otherwise, it does not appear or displayed. Other equivalent variations could be used where the objective is to indicate whether or not the proposed connection is valid. Since the system validated the connection, then the mouse of the requested station will be used to control the numeric pad in Mark's mobile phone.

FIG. 17 represents the selection and dragging/dropping operation where the display output peripheral is moved to timeline section or portion 62.

In FIG. 18, another station is selected, "Notebook Sergio", and the peripherals it has made available to the system. This station is referred to as the "Target Station". It includes a printer in its peripheral bar.

In FIG. 19, the printer of the target station is dragged and dropped in timeline section 62. The connection is validated.

FIG. 20 shows another screen with the queue for the tasks undertaken by system 10 as they are performed.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for controlling input and output peripherals connected to addressable stations, comprising:
   A) a global computer network;
   B) at least two computerized addressable stations connected to said network, each of said at least two stations including at least one input for receiving input peripheral signals and at least one output for generating output peripheral signals and an operating software that includes service software that is initiated upon booting said stations and said service software having stored information about the station where it is installed including said station's assigned address and reachable peripherals;
   C) at least one input peripheral with associated drive software connected to one of said at least one input of one of said at least two stations and at least one output peripheral with associated drive software connected to said at least one output of another station of said at least two stations; and
   D) a computerized server having a storage assembly with control software that includes sufficient data and instructions to permit a user to communicate with said at least two stations and connect to at least one of said at least one input and said at least one output of one of said at least two stations with the input of another of said at least two stations to activate at least one output of said another station, said storage assembly further including a database for storing said drive software for each of said peripherals and said operating software of each of said stations, wherein said control software selectively connects at least one of said inputs or outputs of one of said at least two stations, as a requested station, to at least one of said inputs of another of said at least two stations, as a target station, to generate an output signal on said at least one output of said target station and said control software further including means for translating said input and output signals of said inputs and outputs of said requested station to compatible input and output signals for said at least one input of said target station utilizing said database thereby permitting a user to remotely activate the reachable peripherals of said addressable stations.

2. The system set forth in claim 1 wherein said control software includes a user interface that provides an icon that represents each of said at least two stations.

3. The system set forth in claim 2 wherein said user interface includes a graphic user interface, accessible through said network by a user, displaying graphic representations of said stations and peripherals and further including means for selecting and connecting said stations to identify a requested station and a target station, and each of said selected station displaying the peripherals physically connected thereto and made available through a subscription to the system.

4. The system set forth in claim 3 wherein said control software further includes means for validating the selection and connection of said peripherals and software pursuant to a pre-established criterion.

5. The system set forth in claim 4 wherein said at least two computerized addressable stations communicate with said server through a synchronous connection.

6. The system set forth in claim 5 wherein said control software periodically monitors said service software of each of said at least two stations to update said database on the drive software existing in each of said stations at any given time.

7. A system for controlling input and output peripherals connected to addressable stations, comprising:
A) a global computer network;
B) at least two computerized addressable stations connected to said network, each of said at least two stations including at least one input for receiving input peripheral signals and at least one output for generating output peripheral signals and an operating software that includes service software that is initiated upon booting said stations and said service software having stored information about the station where it is installed including said station's assigned address and reachable peripherals;
C) at least one input peripheral with associated drive software connected to one of said at least one input peripheral of one of said at least two stations and at least one output peripheral with associated drive software connected to said at least one output of another station of said at least two stations; and
D) a computerized server having a storage assembly with control software that includes sufficient data and instructions to permit a user to communicate with said at least two stations and connect to at least one of said at least one input and said at least one output of one of said at least two stations with the input of another of said at least two stations to activate at least one output of said another station, said storage assembly further including a database for storing said drive software for each of said peripherals and said operating software of each of said stations, wherein said control software selectively connects at least one of said inputs of one of said at least two stations, as a requested station, to at least one of said inputs of another of said at least two stations, as a target station, to generate an output signal on said at least one output of said target station and said control software further including means for translating said input and output signals of said inputs and outputs of said requested station to compatible input and output signals for said at least one input of said target station utilizing said database thereby permitting a user to remotely activate the reachable peripherals of said addressable stations.

8. The system set forth in claim 7 wherein said control software includes a user interface that provides an icon that represents each of said at least two stations.

9. The system set forth in claim 8 wherein said user interface includes a graphic user interface, accessible through said network by a user, displaying graphic representations of said stations and peripherals and further including means for selecting and connecting said stations to identify a requested station and a target station, and each of said selected station displaying the peripherals physically connected thereto and made available through a subscription to the system.

10. The system set forth in claim 9 wherein said control software further includes means for validating the selection and connection of said peripherals and software pursuant to a pre-established criterion.

11. The system set forth in claim 10 wherein said at least two computerized addressable stations communicate with said server through a synchronous connection.

12. The system set forth in claim 11 wherein said control software periodically monitors said service software of each of said at least two stations to update said database on the drive software existing in each of said stations at any given time.

13. A system for controlling input and output peripherals connected to addressable stations, comprising:
A) a global computer network;
B) at least two computerized addressable stations connected to said network, each of said at least two stations including at least one input for receiving input peripheral signals and at least one output for generating output peripheral signals and an operating software that includes service software that is initiated upon booting said stations and said service software having stored information about the station where it is installed including said station's assigned address and reachable peripherals;
C) at least one input peripheral with associated drive software connected to one of said at least one input peripheral of one of said at least two stations and at least one output peripheral with associated drive software connected to said at least one output of another station of said at least two stations; and
D) a computerized server having a storage assembly with control software that includes sufficient data and instructions to permit a user to communicate with said at least two stations and connect to at least one of said at least one input and said at least one output of one of said at least two stations with the input of another of said at least two stations to activate at least one output of said another station, said storage assembly further including a database for storing said drive software for each of said peripherals and said operating software of each of said stations, wherein said control software selectively connects at least one of said outputs of one of said at least two stations, as a requested station, to at least one of said inputs of another of said at least two stations, as a target station, to generate an output signal on said at least one output of said target station and said control software further including means for translating said input and output signals of said inputs and outputs of said requested station to compatible input and output signals for said at least one input of said target station utilizing said database thereby permitting a user to remotely activate the reachable peripherals of said addressable stations.

14. The system set forth in claim 13 wherein said control software includes a user interface that provides an icon that represents each of said at least two stations.

15. The system set forth in claim 14 wherein said user interface includes a graphic user interface, accessible through said network by a user, displaying graphic representations of said stations and peripherals and further including means for selecting and connecting said stations to identify a requested station and a target station, and each of said selected station displaying the peripherals physically connected thereto and made available through a subscription to the system.

16. The system set forth in claim 15 wherein said control software further includes means for validating the selection and connection of said peripherals and software pursuant to a pre-established criterion.

17. The system set forth in claim 16 wherein said at least two computerized addressable stations communicate with said server through a synchronous connection.

18. The system set forth in claim 17 wherein said control software periodically monitors said service software of each of said at least two stations to update said database on the drive software existing in each of said stations at any given time.

19. A method for controlling input and output peripherals connected to addressable stations comprising the steps of:
  A) setting up a network with a server and at least two interconnected addressable stations, each of said stations including at least one input and at least one output, and each of said at least two stations including at least one reachable peripheral connected to said input or output;
  B) booting up said stations to transmit their respective addresses and a list of reachable peripherals to said server;
  C) activating the software in said server to provide the software drivers for each of said peripherals upon demand and further providing software for exchanging information between said driver software; and
  D) generating a user-friendly interface for making the selected connections of peripherals and means for monitoring the progress of their performance.

* * * * *